United States Patent
Lee

(10) Patent No.: US 7,010,045 B2
(45) Date of Patent: Mar. 7, 2006

(54) DECODER HAVING DIGITAL IMAGE STABILIZATION FUNCTION AND DIGITAL IMAGE STABILIZATION METHOD

(75) Inventor: Sung-Hee Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 554 days.

(21) Appl. No.: 09/887,535

(22) Filed: Jun. 25, 2001

(65) Prior Publication Data

US 2002/0118761 A1   Aug. 29, 2002

(30) Foreign Application Priority Data

Jun. 28, 2000   (KR) ............................... 2000-35953

(51) Int. Cl.
*H04B 1/66* (2006.01)
(52) U.S. Cl. .............................................. 375/240.25
(58) Field of Classification Search ............................... 375/240.01–240.29; 382/236, 238; 348/208.4; H04N 1/66
See application file for complete search history.

(56) References Cited

U.S. PATENT DOCUMENTS

| | | | | |
|---|---|---|---|---|
| 5,430,480 A | * | 7/1995 | Allen et al. ............... 348/208.4 |
| 5,510,834 A | * | 4/1996 | Weiss et al. ................... 348/97 |
| 6,222,882 B1 | * | 4/2001 | Lee et al. ............... 375/240.16 |
| 6,249,613 B1 | * | 6/2001 | Crinon et al. ................ 382/236 |
| 6,285,711 B1 | * | 9/2001 | Ratakonda et al. ..... 375/240.16 |
| 6,674,799 B1 | * | 1/2004 | Rhee ...................... 375/240.21 |

FOREIGN PATENT DOCUMENTS

| | | |
|---|---|---|
| EP | 0 689 359 A2 | 12/1995 |
| GB | 2 277 002 A | 10/1994 |
| GB | 2 308 774 A | 7/1997 |
| GB | 2 333 413 A | 7/1999 |

* cited by examiner

*Primary Examiner*—Tung Vo
(74) *Attorney, Agent, or Firm*—Sughrue Mion, PLLC

(57) ABSTRACT

A decoder and a method for preventing and correcting a fluctuated image which occurs due to a user's fluctuated hand when recording using a mobile image communication system by adapting a digital image stabilization technique in a video decoder are provided. When decoding an encoded bit stream by the macro block unit, a motion information is extracted, and one global motion vector is determined using the extracted information. The global motion vector is directed to a motion of a mobile image communication system, and it is possible to obtain a stabilized image by correcting the decoded image data stored in a frame memory using the global motion vector. Since only the motion information is used in the encoded bit stream, a hardware construction is simplified. Therefore, the decoder is well adapted to compute a large amount of data.

15 Claims, 5 Drawing Sheets

DECODER HAVING DIGITAL IMAGE STABILIZATION FUNCTION AND DIGITAL IMAGE STABILIZATION METHOD

BACKGROUND OF THE INVENTION

1. Field of the Invention

The present invention relates to a decoder, and in particular to a decoder for implementing an image stabilization and a digital image stabilization method using an additional information extracted from a coded bit stream.

2. Description of the Background Art

An image compression is directed to storing a large amount of image information and transmitting the same. In a mobile image communication system, a coding, decoding and transmission operation of an image is performed in real time. A motion compensation codec is capable of a large amount of image information in the mobile image communication system. When using a camcoder which adapts a motion compensation codec, a fluctuating phenomenon occurs in a user's hand, so that a degradation of image occurs due to the fluctuated hand. The digital image stabilization is directed to correct the fluctuation of the image for thereby improving a video quality of the image. Various types of digital video stabilization apparatus are introduced in the industry.

FIG. 1 is a view illustrating the construction of a digital image stabilization unit and a video codec. As shown therein, a digital image stabilization unit 10 receives a fluctuated video and outputs a stabilized video signal. A video encoder 20 receives a stabilized video signal and encodes the same. An encoded bit stream from the video encoder 20 is inputted into a video decoder 30 and is decoded thereby. Therefore, the video decoder 30 outputs a decoded video signal.

FIG. 2 is a detail block diagram of the digital image stabilization unit 10 of FIG. 1. As shown therein, a digital image stabilization unit 10 includes an image memory 10, an image enlarging unit 16 and a motion vector detector 12. The motion vector detector 12 detects a motion vector from the inputted fluctuated image. The apparatus of FIG. 2 includes a global motion vector detector 13 for detecting a global motion vector with respect to the detected motion vector, a motion vector integration unit 14 for receiving the detected global region motion vector and integrating the same, and a stabilization image output unit 15 for outputting the stabilized image from the integrated motion vector.

The digital image stabilization apparatus of FIG. 2 is used as a preprocessor of the motion compensation codec. As shown therein, the inputted fluctuated image is concurrently inputted into the image memory 11, the motion vector detector 12 and the image enlarging unit 16. The motion vector detector 12 compares the fluctuated image of the current frame with an image of a previously stored previous image. The global motion vector detector 13 detects a global motion vector which occurs based on every frame with respect to the motion vector detected by the motion vector detector 12. The detected global motion vector is outputted to the motion vector integration unit 14. In addition, the motion vector integration unit 14 integrates the inputted global motion vector, and the stabilization image output unit 15 compensates the motion using the motion vector and outputs a stabilized image. The above-described operation will be explained in detail with reference to FIG. 3.

FIG. 3 is a view illustrating a reference point in a region and a certain sub-region for estimating a motion of each sub-region by the motion vector detector 12 of FIG. 2.

The motion vector detector 12 determines three sub-regions for judging the motion due to the fluctuated state of the user's hand in two neighboring images which are continuously inputted and sets a reference point in each sub-region. In addition. The position having a highest relational value is determined as a motion vector of a sub-region by comparing the reference points of the current frame and the reference points of the previous frame. The global motion vector detector 13 receives a motion vector of each sub-region and detects a global motion vector. At this time, the motion estimation in the image having a moving object or a lower luminance may detect an erroneous vector. Therefore, in order to detect the erroneous vector, the global motion vector detector 13 is used. In the conventional art, in order to judge an accurate motion vector, it is judged using a relational value in the position which is determined as the motion vector and a relational value in the neighboring position. In the global motion vector detector 13, a global motion vector occurs based on every frame. In order to correct the fluctuating state of the image using the global motion vector, the global motion vector in the current frame is integrated as follows based on the first frame of the image sequence. The integration of the global motion vector is performed by the motion vector integration unit 14.

$$\vec{V_{INT}}(n) = k\vec{V_{INT}}(n-1) + \vec{V_{ACT}}(n) \quad (1)$$

In the equation 1, $\vec{V_{INT}}(n)$ and $\vec{V_{ACT}}(n)$ are the integration motion vector and the global motion vector of the n-th frame, and "k" represents a damping coefficient.

The stabilization image output unit 15 compensates the motion using an integrated motion vector in the enlarged image inputted from the image enlarging unit 16 for thereby obtaining a stabilized image.

The conventional digital image stabilization apparatus is directed to performing a motion estimation in the input image for correcting the fluctuating state of the image, estimating the motion of the camera based on a result of the estimation and obtaining the stabilized image.

In the digital image stabilization operation, a few number of sub-regions are determined in order to decrease the amount of the computation and the complexity of the hardware without using the entire images, and the motion is estimated with respect to the determined sub-regions. In addition, in order to decrease the amount of computation, a few number of reference points are used without using all pixel values in the sub-regions. The above-described method is capable of decreasing the amount of computation using a few number of the reference points. However, a motion estimation performance is decreased due to a lack of the data used in a matching process. Therefore, in the conventional digital image stabilization technique, since a motion estimation technique is additionally used in addition to the motion estimation in the video codec, the complexity of the system is increased.

SUMMARY OF THE INVENTION

Accordingly, it is an object of the present invention to provide a decoder for efficiently performing a digital image stabilization using an additional information extracted from an encoded bit stream in a video codec without performing a motion estimation operation in a digital image stabilization system.

It is another object of the present invention to provide a method for performing a digital image stabilization using a video decoder.

In order to achieve the above objects, there is provided a decoder having a digital image stabilization function which includes a VLD for separating an image information and an additional information from an encoded bit stream, a global motion computation unit for computing a global motion vector using a local motion vector with respect to a background region in an additional information from the VLD, a time-based integration unit for receiving a global motion vector from the global motion computation unit and time-integrating the global motion vector based on a frame type, and a global motion compensation unit for stabilizing a recovery image using a global motion vector integrated by the time-based integration unit.

In order to achieve the above objects, there is provided a digital image stabilization method which includes a separation step for receiving an encoded bit stream and separating into an image information and an additional information, a computation step for computing a global motion vector using a local motion vector concerning the motion of a background region in the additional information separated in the separation step, an integration step for receiving the computed global motion vector and time-integrating the received global motion vector based on the frame type, and a stabilization step for stabilizing a recovery image using the global motion vector integrated in the integration step.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The present invention will be explained with reference to the accompanying drawings.

Figure 1:
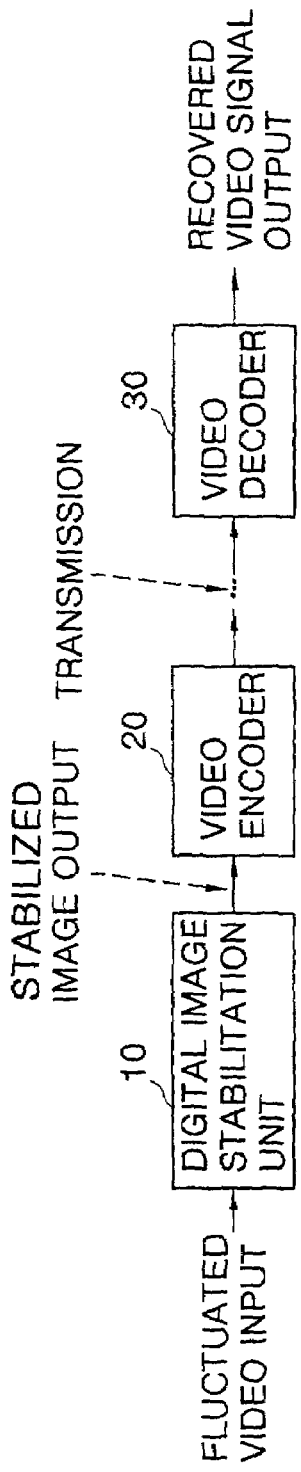
FIG. 1 is a view illustrating the construction of a video codec having a conventional digital image stabilization apparatus.
Figure 2:
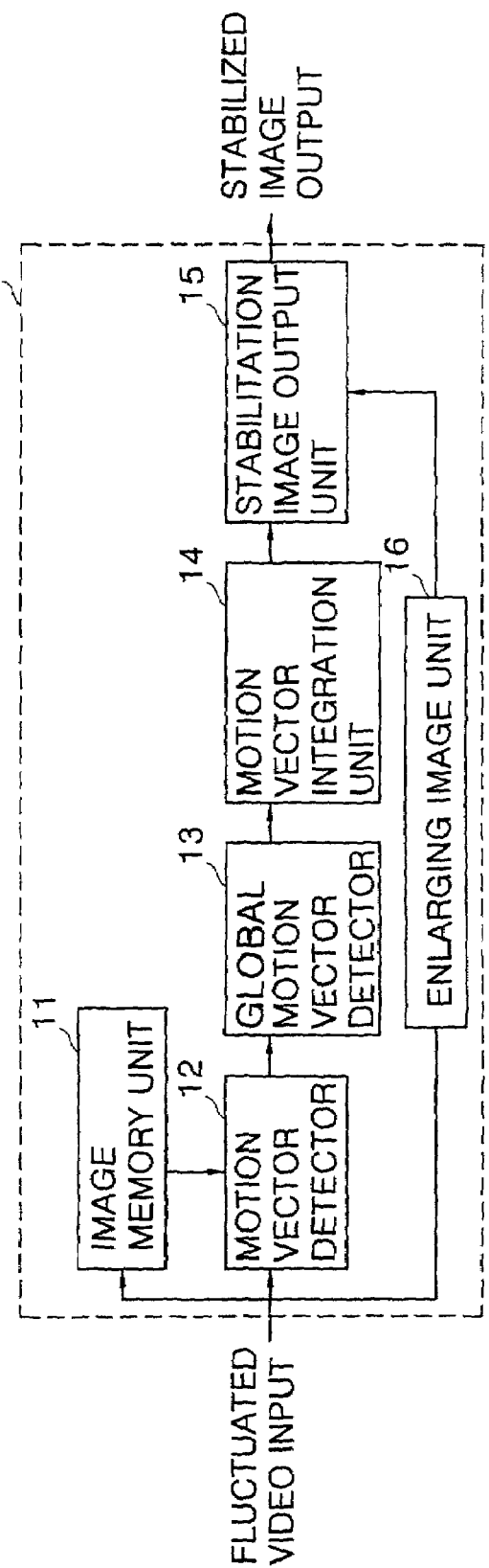
FIG. 2 is a block diagram illustrating a digital image stabilization unit of FIG. 1.
Figure 3:
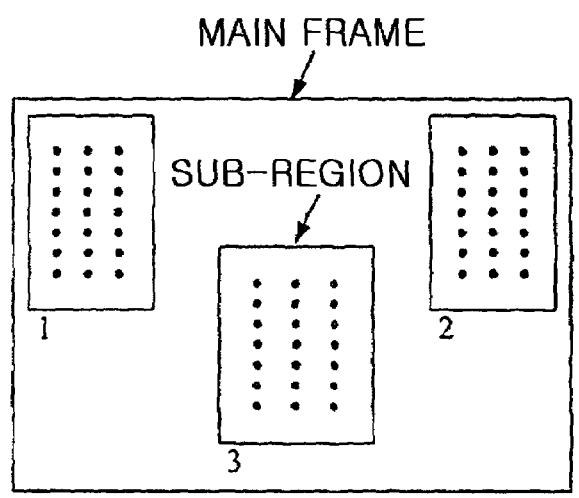
FIG. 3 is a view for describing a conventional motion estimation method.
Figure 4:
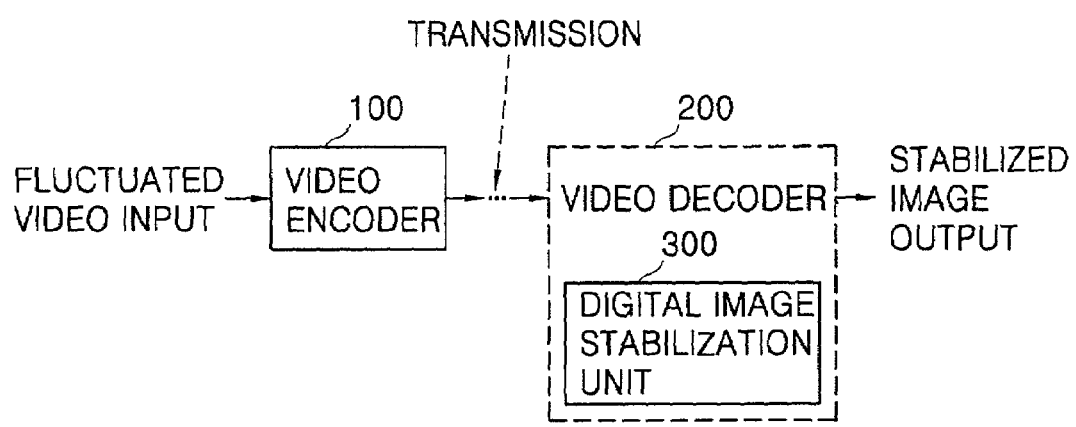
FIG. 4 is a view illustrating the construction of a video codec according to an embodiment of the present invention.

A video codec of FIG. 4 includes a video encoder 100 for transmitting an encoded bit stream and a video decoder 200 for receiving and decoding an encoded bit stream. The video decoder 200 includes a digital image stabilization unit 300 according to the present invention for thereby performing a digital image stabilization based on an additional information of an encoded bit stream.

The video decoder 200 will be described in detail with reference to FIG. 5.

Figure 5:
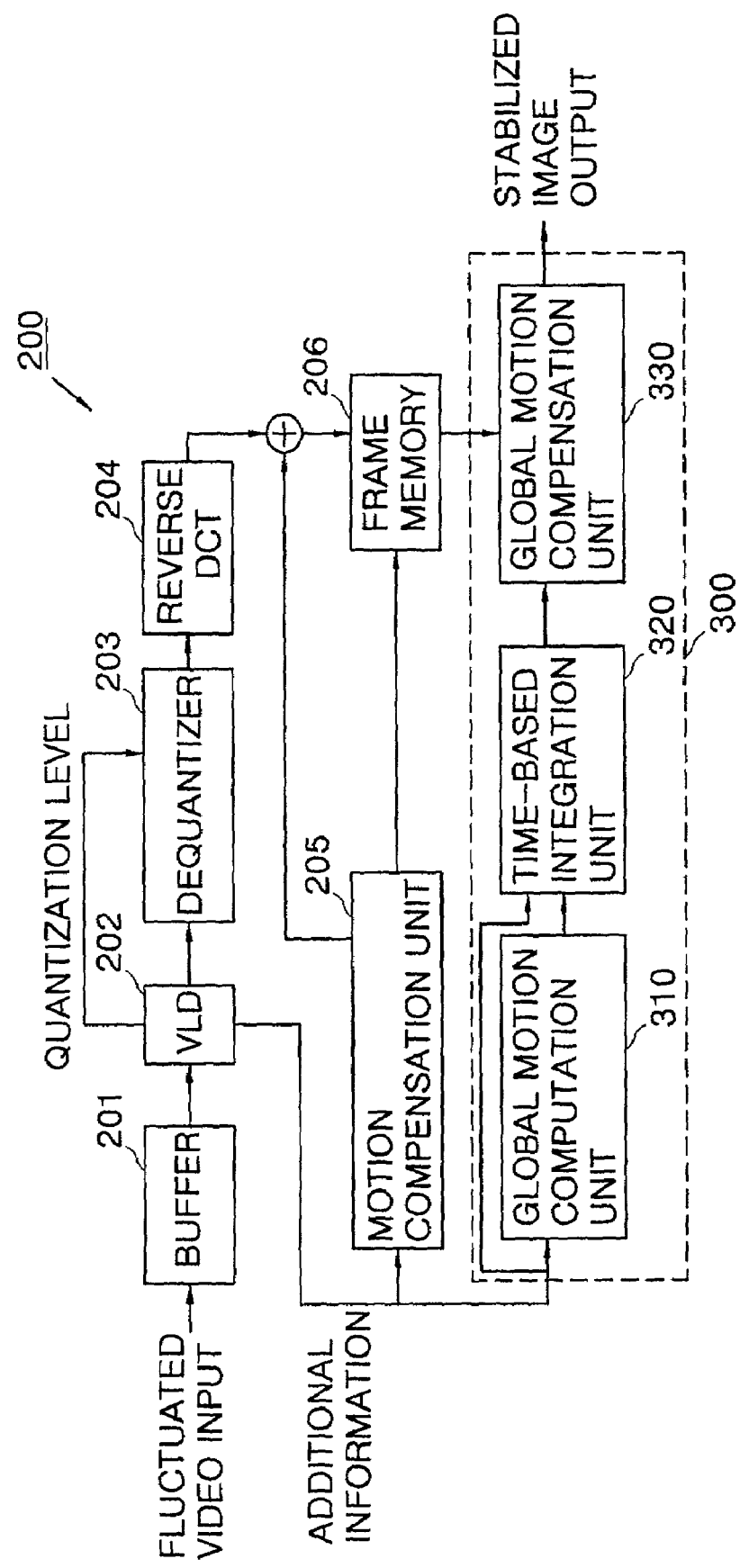
FIG. 5 is a block diagram illustrating a video decoder having a digital image stabilization function of FIG. 4.

As shown in FIG. 5, there are provided a buffer 201 for receiving and outputting a fluctuated image of an encoded bit stream, and a variable length decoding unit(VLD) 202 for separating a bit stream from the buffer 201 into an image information and an additional information. In addition, there are provided a dequantizer 203 for receiving an image information from the VLD 202, a reverse DCT 204, a motion compensation unit 205 for receiving an additional information from the VLD 202, and a digital image stabilization unit 300. A frame memory 206 which stores an image information is connected with a motion compensation unit 205. The digital image stabilization unit 300 includes a global motion computation unit 310 connected between the VLD 202 and the frame memory 206, a time-based integration unit 320 and a global motion compensation unit 330. Here, the additional information is formed of a motion vector of a macro block unit and a frame type of a macro block.

As shown in FIG. 5, the buffer 201 receives a fluctuated image of an encoded bit stream type and outputs to the VLD 202. The VLD 202 decodes the inputted bit stream based on the variable length operation and outputs an image information and an additional information. The image information is inputted into the dequantizer 203 and is dequantized based on the quantizing level. The reverse DCT 204 performs a reverse DCT with respect to the dequantized image and converts into a state before the DCT is performed. The thusly recovered image is stored into the frame memory 206 as a reference image. The additional information is inputted into the motion compensation unit 205 and the digital image stabilization unit 300. The motion compensation unit 205 compensates the image of the current frame based on the reference image stored in the frame memory 206 using the inputted additional information. The global motion computation unit 310 of the digital image stabilization unit 300 computes the global motion vector using the motion vector of the macro block unit from the bit stream.

Figure 6:
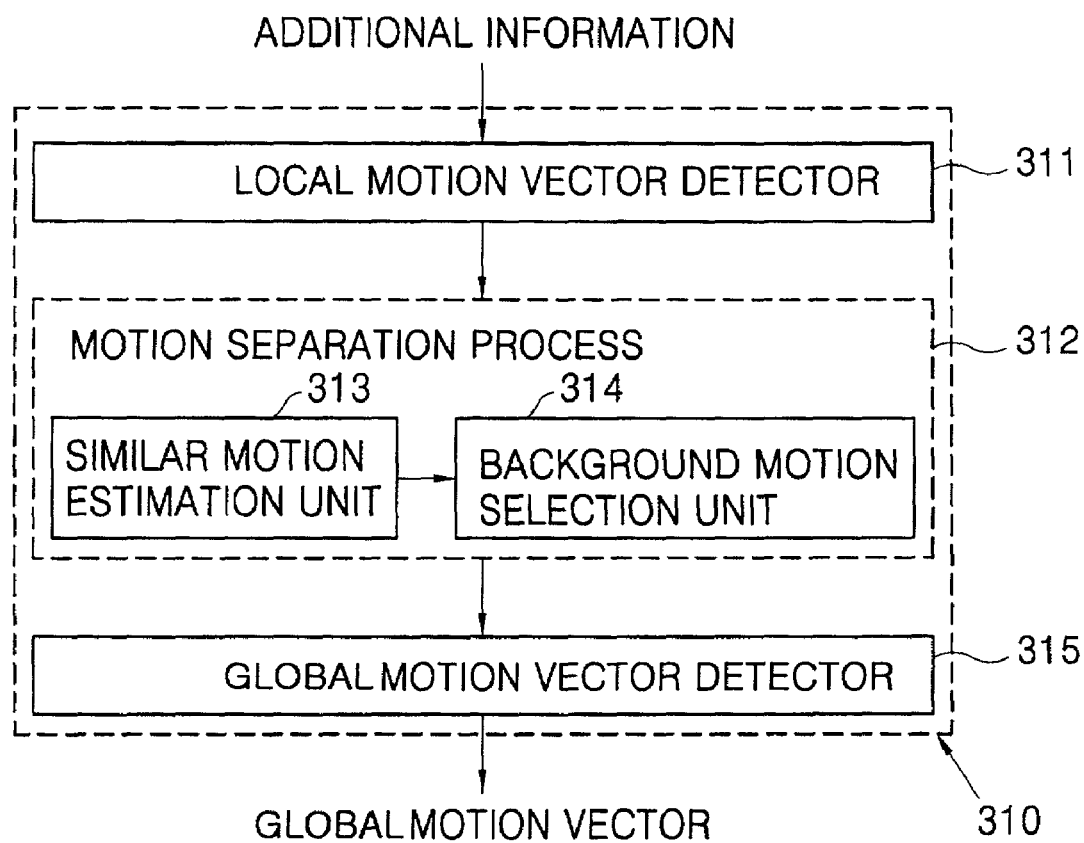
FIG. 6 is a block diagram illustrating a global motion computation unit of FIG. 5.

FIG. 6 is a block diagram illustrating the global motion computation unit 310.

A local motion vector detector 311 of the global motion computation unit 310 computes the local motion vector of the macro block unit and outputs the same. The local motion vector detector 311 separates the local motion vector of the macro block unit according to a frame type and detects the same. Each frame type based on the motion compensation includes an I-frame for an intra-encoding operation, a P-frame for a forward estimation encoding operation, and a B-frame for a bidirectional estimation encoding operation. For the recovery of the P-frame, the I-frame becomes a reference frame, and for the recovery of the B-frame, the I- or P-frame becomes a reference frame. Since the I-frame is intra-encoded, the motion vector does not exist. The B-frame has forward and backward motion vectors from two reference frames. Therefore, the motion vector of the B-frame between the I-frame and the previous reference frame is used. Namely, in the B-frame between the current I-frame and the previous P-frame, the difference value between the forward motion vector from the previous P-frame and the backward motion vector from the I-frame becomes a forward motion vector of the previous reference frame. The motion vector of the P-frame is processed in the same manner as the method of the I-frame. The forward motion vector from the previous reference I-frame of the P-frame or the P-frame is used without an additional computation. The B-frame includes a forward motion vector from the previous reference frame and the backward motion vector from the reference frame. Therefore, the forward or backward motion vector from the reference frame is selected.

Figure 7:
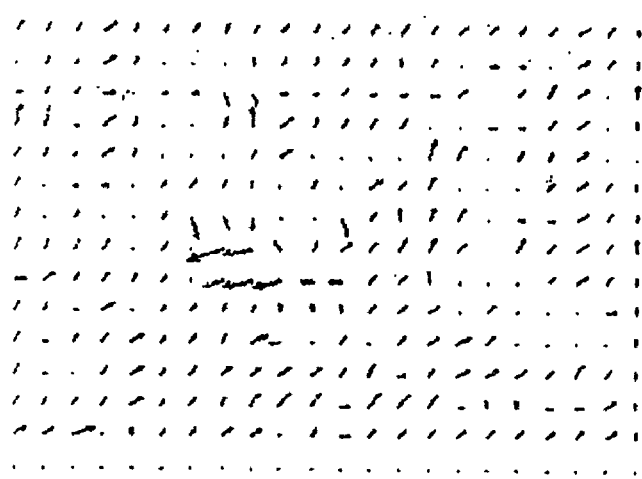
FIG. 7 is a view for describing a motion field according to the present invention.

FIG. 7 is a view illustrating a motion field formed based on the frame unit with respect to the detected local motion vector. In the embodiment of the present invention, the local motion vector generated by the motion of the object is excluded, and the local motion vector generated by the motion of the background region is used for thereby extracting the global motion vector. The detected local motion vector is inputted into the motion separating processor 312. The motion separating processor 312 is formed of a similar motion estimation unit 313 and a background motion selector 314. The similar motion estimation unit 313 divides the local motion vector into a K-number of clusters based on the clustering technique. The background motion selection unit 314 selects a certain cluster having a highest motion possibility of the background region among the divided K-number clusters. The global motion vector detector 315 detects the global motion vector from the local motion vector in the clusters selected by the background motion selection unit 314 and outputs to the detected global motion vector to the time-based integration unit 320.

The clustering process for detecting the global motion vector is performed as follows.

Step 1. Initialization

The K-number of the clusters is determined, and an initial reference value of each cluster is determined.

Step 2. Classification of Samples

All sample vectors are classified. The sample vector Vn is included in a certain cluster among the K-number of clusters based on the following equation.

$$Vn \in Sj, \text{ if } \|Vn-Zi\| < \|Vn-Zj\|, \text{ for all } I=1, 2, \ldots, K, i \neq j \quad (2)$$

Here, $Sj=\{X|X$ is near the cluster "j"$\}$ where $1 \leq n \leq N$.

Step 3. New Cluster-Based Computation

The center of a new cluster is computed in such a manner that the distance from the center of the cluster is minimized based on the following equation with respect to the clusters generated in Step 2.

$$Zj=1/Nj\Sigma Vn(Vn \in Sj) \quad (3)$$

Where Nj represents the number of the samples in a new cluster generated in Step 2.

Step 4. Judgement of Convergence

If a new center of the cluster Sj is the dame as the previous center, the clustering operation is stopped, and if a new center of the same is different from the previous center, the routine is returned to Step 2.

In order to detect the global motion vector, the local motion vector is divided into a plurality of clusters, and one cluster having a motion of the background region is selected. At this time, it is assumed that the pixels of the image due to the global motion vector are moved in the same direction and size. The above assumption has the following two conditions. One condition is that the number of the samples in the cluster having the local motion vectors having a certain value similar to the global motion is much larger than the number of the samples in the other clusters, and the other condition is that the distribution of the samples in the cluster having the local motion vector having a certain shape similar to the global motion vector is much smaller than the distribution of the sample in the other clusters. In the present invention, it is assumed that the cluster which satisfies the above two conditions includes the global motion vector and is selected as a cluster having a motion of a background region.

The method for detecting a global motion vector in the selected cluster is implemented based on the following equation.

$$Vg=\text{median}\{Vn\}, Vn \in Sj \quad (4)$$

where Vg represents a global motion vector, and Sj represents a cluster having a motion of a background region. In order to detect the global motion vector in the selected cluster, the method for obtaining a median value of the local motion vector is capable of decreasing an error compared to the method in which an average of the local motion vector is obtained for thereby enhancing a detection performance.

Figure 8:
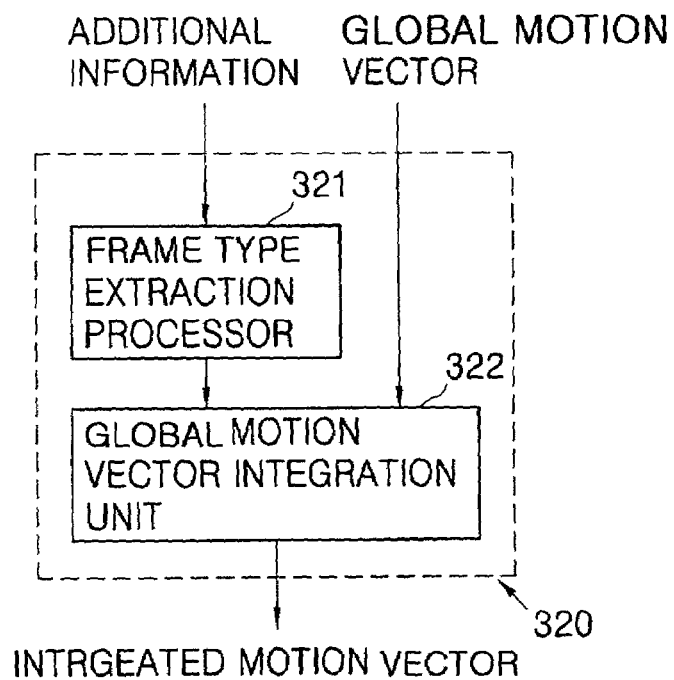
FIG. 8 is a block diagram illustrating a time-based integration unit of FIG. 5.
Figure 9:
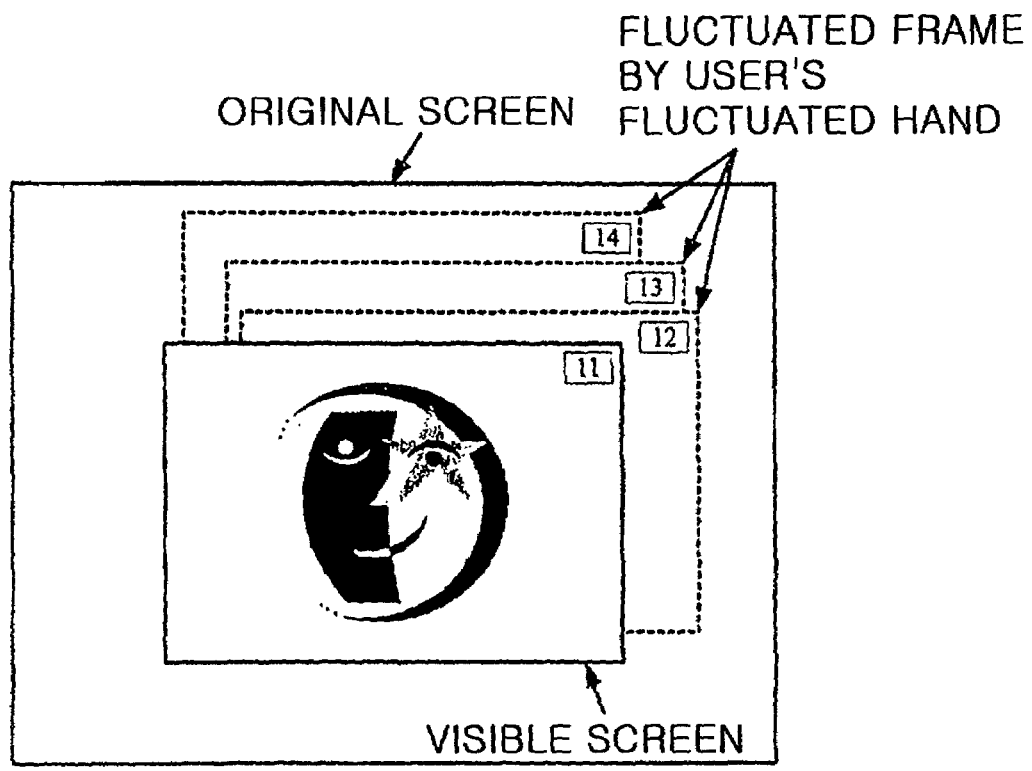
FIG. 9 is a view for describing a global motion compensation according to the present invention.

FIG. 8 is a view illustrating a time-based integration unit of FIG. 5.

The time-based integration unit 320 is formed of a frame type extraction processor 321 and a global motion vector integration unit 322. The time-based integration unit 320 integrates the global motion vector inputted from the global motion vector computation unit 310 based on the frame type. Namely, the frame type extraction processor 321 extracts the frame type of the input image based on an additional information from the VLD 202. In addition, the global motion vector integration unit 322 receives a global motion vector and integrates the global motion vector based on the frame type from the frame type extraction processor 321. Namely, in the case that the frame type is "I" or "P", the global motion vector is directly integrated, and in the case of the B-frame, the global motion vector is integrated only when the B-frame is corrected. The global motion compensation unit 330 compensates the fluctuated image inputted from the frame memory 206 using the integrated global motion vector for thereby stabilizing the image. The global motion compensation unit 330 stabilizes the fluctuated images 12, 13 and 14 and outputs the stabilized images to the screen 11.

As described above, the digital image stabilizing apparatus according to the present invention does not have a complicated hardware construction because the global motion vector is detected using the additional information extracted by the encoded bit stream. Therefore, the digital image stabilizing apparatus according to the present invention is well adapted to correct the fluctuated images in the mobile image communication system such as a next generation mobile phone system or a mobile multimedia terminal which require a low transmission rate.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A video decoder having a digital image stabilization function, the decoder comprising:
    a VLD for separating an image information and an additional information from an encoded bit stream;
    a global motion computation unit for extracting a motion vector of a macro block unit from the additional information applied from the VLD, and computing a global motion vector using a local motion vector with respect to a background region in an additional information from the VLD;

a time-based integration unit for extracting a frame type from the additional information, judging whether the global motion vector is integrated according to the extracted frame type to generate a judgment, and integrating a global motion vector from the global motion computation unit based on the judgment; and a global motion compensation unit for motion-compensating and stabilizing a recovery image using a global motion vector integrated by the time-based integration unit.

2. The decoder of claim 1, wherein said global motion computation unit classifies local motion vectors of the macro block unit contained in the additional information into a local motion vector with respect to the motion of the background region using a clustering technique, and detects a global motion vector through the classified local motion vectors of the background region.

3. The decoder of claim 2, wherein said global motion computation unit includes:

a local motion vector detector for receiving an additional information from the VLD and extracting the local motion vectors by the macro block unit;

a motion separating processor for separating the local motion vectors extracted by the local motion vector detector and separating a local motion vector concerning the motion of the background region; and a global motion vector detector for detecting one global motion vector based on the local motion vector of the background region separated by the motion separation processor.

4. The decoder of claim 3, wherein said motion separation processor includes:

a similar motion estimation unit for separating the local motion vectors extracted from the local motion vector detector into a certain number of clusters; and a background motion selector for selecting a cluster which has a motion of the background region among the clusters separated by the similar motion estimation unit.

5. The decoder of claim 1, wherein said time-based integration unit includes:

a frame type extraction unit for extracting a frame type from the additional information from the VLD; and a global motion vector integration unit for integrating the global motion vector based on the frame type extracted by the frame type extraction processor.

6. The decoder of claim 5, wherein said time-based integration unit directly integrates the global motion vector in the case that the frame type is "I" and "P" and integrates the global motion vector when correcting the B-frame in the case of B-frame.

7. A digital image stabilization method using a video decoder, comprising the steps of:

a separation step for receiving an encoded bit stream and separating into an image information and an additional information;

a computation step for extracting a motion vector of a macro block unit from the additional information applied from the VLD, and computing a global motion vector using a local motion vector concerning the motion of a background region in the additional information separated in the separation step;

an integration step for extracting a frame type from the additional information, judging whether the global motion vector is integrated according to the extracted frame type to generate a judgment, and integrating a global motion vector from the global motion computation unit based on the judgment; and a stabilization step for motion-compensating and stabilizing a recovery image using the global motion vector integrated in the integration step.

8. The method of claim 7, wherein said computation step includes:

a first step for receiving the additional information and classifying local motion vectors of the macro block unit contained in the additional information into a local motion vector with respect to the motion of the background region using a clustering technique;

a second step for separating the local motion vector classified in the first step and separating the local motion vector concerning the motion of the background region; and a third step for detecting one global motion vector based on the local motion vector of the background region separated in the second step.

9. The method of claim 8, wherein said second step comprises the steps of:

2 a for separating the local motion vector extracted in the first step into a certain number of the clusters; and 2 b for selecting a certain cluster which has a motion of the background region among the clusters separated in the step 2a.

10. The method of claim 7, wherein said integration step includes:

a first step for extracting a frame type from the additional information; and a second step for integrating the global motion vector based on the frame type extracted in the first step.

11. The method of claim 10, wherein in said integration step, the global motion vector is directly integrated in the case that the frame type is "I" and "P", and the global motion vector is integrated when correcting the B-frame in the case of the B-frame.

12. The decoder of claim 1, wherein said global motion compensation unit compensates a fluctuated image inputted from a frame memory using said integrated global motion vector to stabilize said fluctuated image.

13. The decoder of claim 12, wherein a fluctuation of said fluctuated image is caused by one or more unsteady movements of a camera.

14. The method of claim 7, wherein in said stabilization step, a fluctuated image inputted from a frame memory is compensated using said integrated global motion vector to stabilize said fluctuated image.

15. The method of claim 14, wherein in said stabilization step, a fluctuation of said fluctuated image is caused by one or more unsteady movements of a camera.

* * * * *